United States Patent [19]

Roumagnac

[11] Patent Number: 5,056,612

[45] Date of Patent: Oct. 15, 1991

[54] DEVICE FOR GUIDING THE MOVEMENT ON THE GROUND OF A SELF-DRIVEN MACHINE

[76] Inventor: Max Roumagnac, 7 rue Berlioz, 33127 Martignas, France

[21] Appl. No.: 390,984

[22] Filed: Aug. 7, 1989

[30] Foreign Application Priority Data

Aug. 8, 1988 [FR] France ............................... 88 10815

[51] Int. Cl.$^5$ .............................................. A61B 7/02
[52] U.S. Cl. ..................................... 180/131; 180/167; 242/86.5 R; 242/107.4 A
[58] Field of Search ........................ 180/167, 168, 131; 15/340.1, 340.3, 340.4, 53.3; 242/86.5 R, 107.4 A; 56/10.2, 16.7, DIG. 15

[56] References Cited

U.S. PATENT DOCUMENTS

| | | | |
|---|---|---|---|
| 2,824,616 | 2/1958 | Knight et al. | 180/168 |
| 3,258,082 | 6/1966 | Amos et al. | 180/131 |
| 4,347,908 | 9/1982 | Anderson | 180/131 |

*Primary Examiner*—Andres Kashnikow
*Assistant Examiner*—Eric Culbreth
*Attorney, Agent, or Firm*—Foley & Lardner

[57] ABSTRACT

A method and device are disclosed for controlling the movement of a machine on a surface. The device comprises an obstacle disposed along at least part of an area to be traversed by the machine, a winder-unwinder device connected to the machine, and an anchor which is located remote from the machine and which is stationary with respect to the surface. A flexible connection is attached at one end to the machine at another end to the anchor. An obstacle detector, carried by the machine, detects the presence of the obstacle. A device successively frees a given length of the connection when the obstacle is detected. A propulsive device causes the machine to travel in a direction in which the connection is stretched again after the length of the connection is freed, and then causes the machine to travel in a direction which is opposite to a direction in which the machine was travelling before the obstacle was detected.

9 Claims, 4 Drawing Sheets

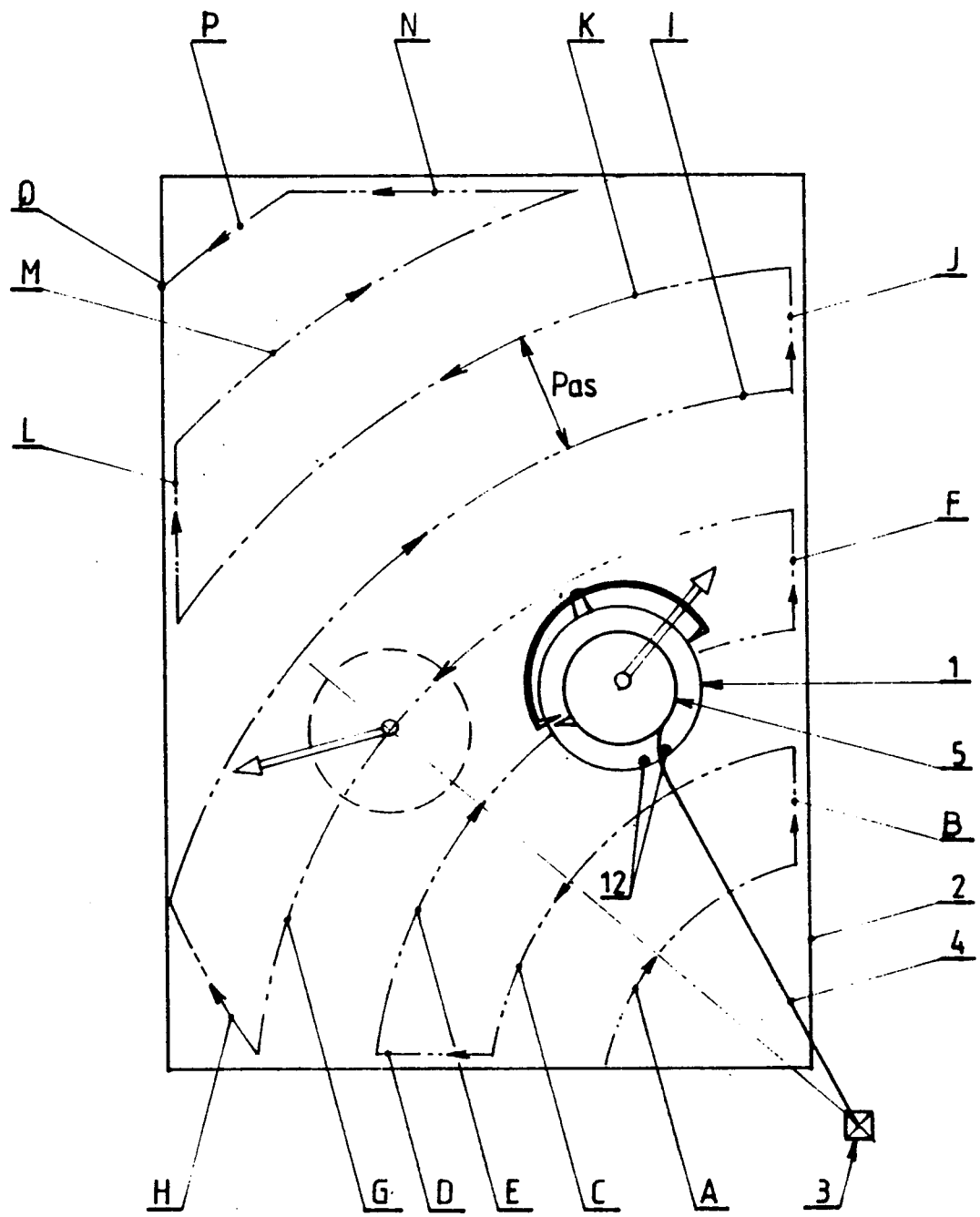
FIG_1_

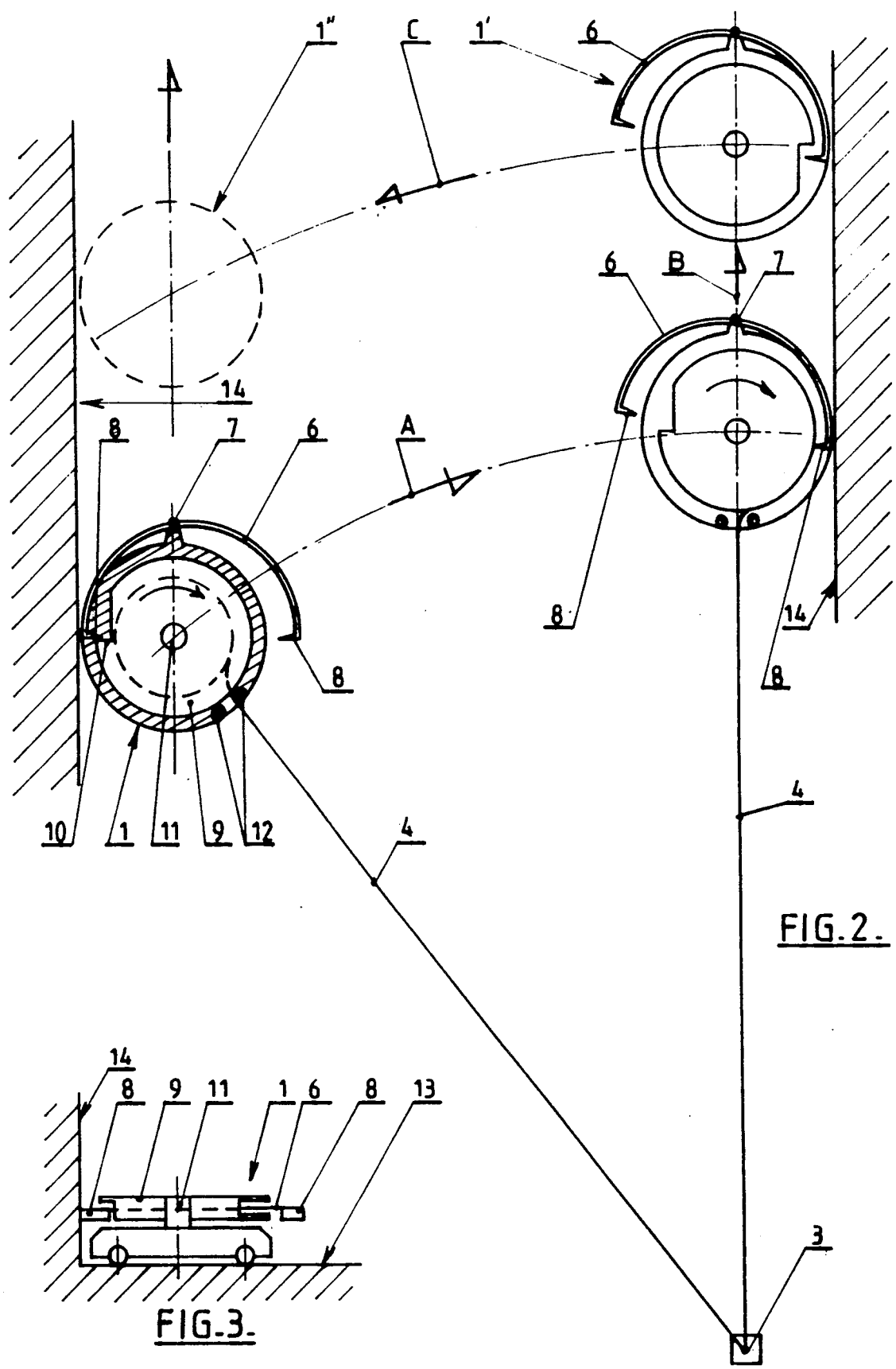

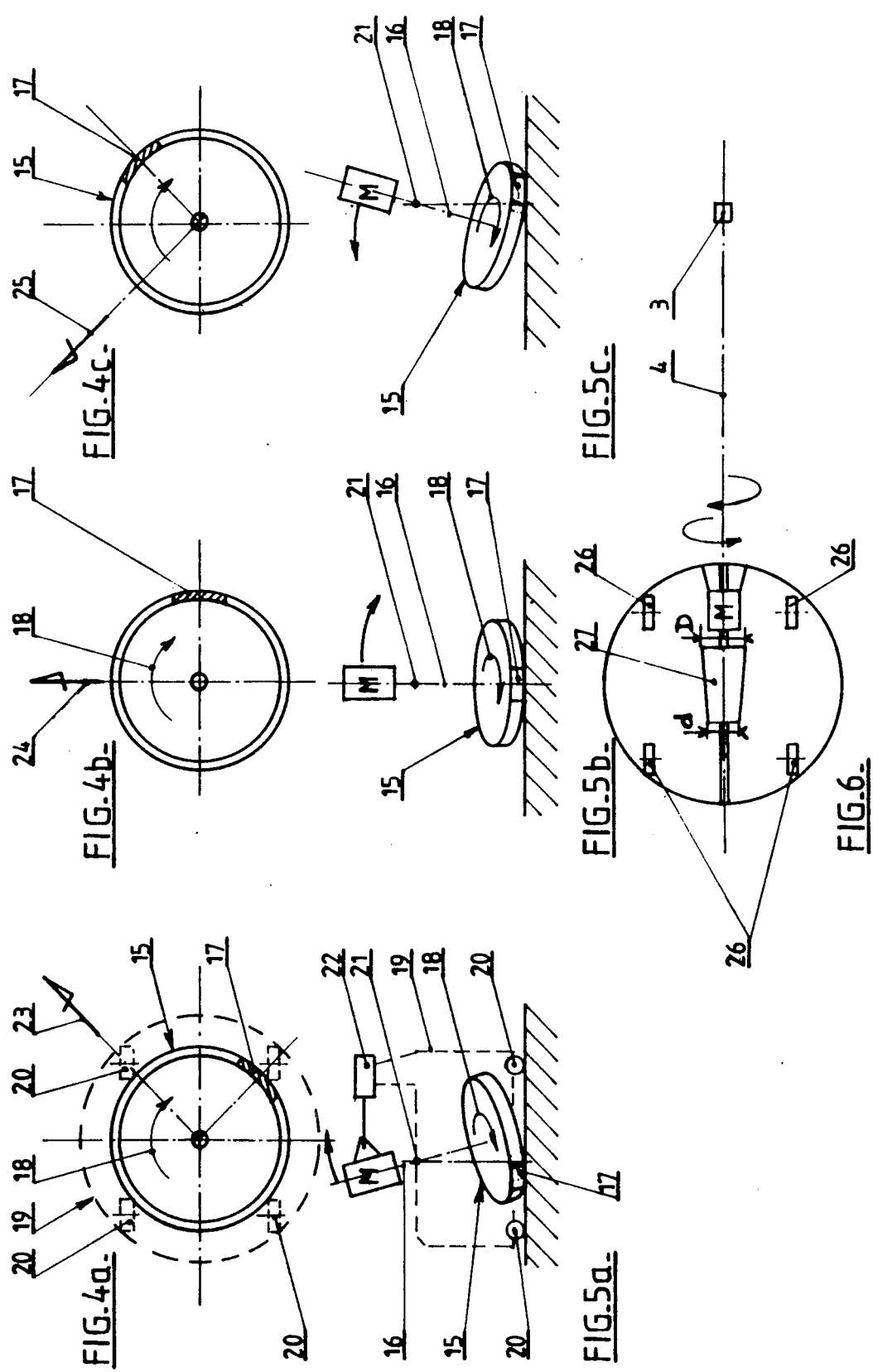

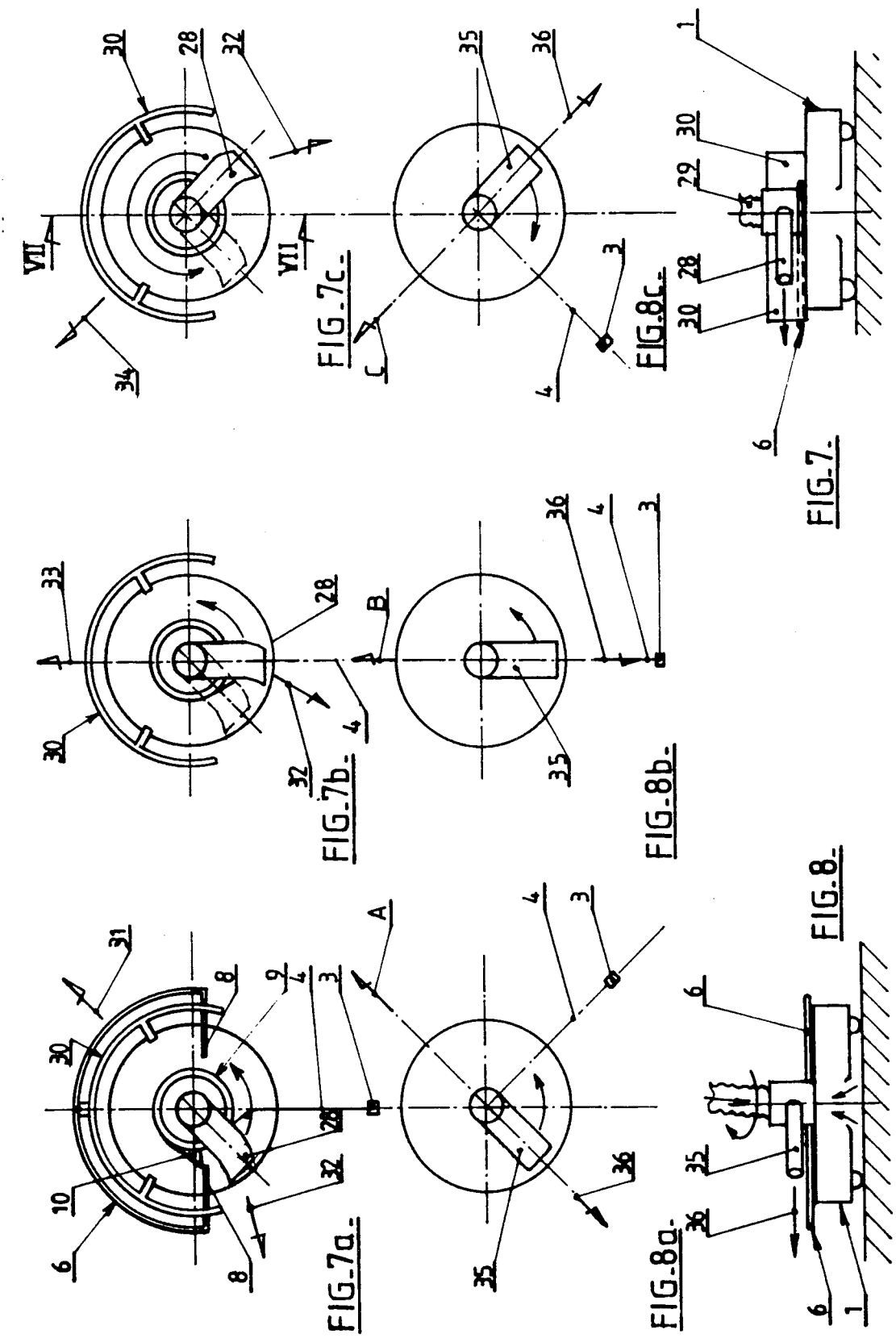

DEVICE FOR GUIDING THE MOVEMENT ON THE GROUND OF A SELF-DRIVEN MACHINE

BACKGROUND OF THE INVENTION

The present invention relates to a device for guiding the movement on the ground of a self-driven machine and more precisely a device intended to compel said machine to sweep a given area systematically, i.e. progressively and totally, without having to pass a second time over a zone already swept and of course without leaving any dead zone.

The invention applies generally to any machine equipped with a propulsive or moving means, of whatever kind, and charged with any task such, for example, as a cleaning task (brushing, washing under pressure, suction, etc. . . .), a work task (sand-papering, polishing, smoothing, surfacing, etc. . . .) or an agricultural task (grass cutting, spraying, spreading, etc. . . .).

Most of the above tasks are most often carried out manually, sometimes with remote guided or remote controlled machines and, in some cases, by robots using sophisticated programmed or guidance systems.

SUMMARY OF THE INVENTION

The aim of the invention is to provide a system of simple design using only independent mechanical elements, which is automatic in that it provides integral sweeping from one end to the other of the area considered reliably and without any intervention.

For this, the invention has as an object a device for guiding the movement on the ground of a machine, characterized in that it comprises, on the one hand, an obstacle, which is removable or not, disposed along all or part of the periphery of the area to be swept and, on the other hand, a flexible connection attached, at one end, to an anchorage point and connected, at its other end, to the machine via a winder-unwinder drum, an obstacle detector carried by the machine and capable of detecting the presence of said obstacle defining said area and, at each detection, to successively free a given length of connection, then to cause the machine to move in a direction in which said connection is stretched again and, finally, in a direction opposite that preceding contact with the obstacle, and means for stopping the machine when said connection is not stretched again or has reached its maximum prefixed length.

Such a device thus makes it possible for the machine moving over the ground to progressively sweep the whole area defined by the obstacle which exists, such as a wall, or which is placed for this purpose, by a succession of concentric circular path fractions further and further away from a fixed point formed by the anchorage point of the connection or an intermediate point from which the sweeping takes place.

This device can be used with a surface, over which it moves, which may or may not be flat.

BRIEF DESCRIPTION OF THE DRAWINGS

Other features and advantages will be clear from the following description of embodiments of the device of the invention, which description is given by way of example with reference to the accompanying drawings in which:

FIG. 1 illustrates schematically the movement on the ground of a self-driven machine equipped with a device of the invention;

FIG. 2 illustrates more precisely the phases of reversing the direction of movement of the machine in contact with the obstacle defining the area to be swept;

FIG. 3 is an elevational and sectional view of the machine of FIG. 2 at the time of its contact with the obstacle defining on the left the area to be swept;

FIGS. 4a, 4b, 4c show schematically in a top view the successive positions, at the time of reversal of the direction of movement of the machine having a circular brush in contact with the ground;

FIGS. 5a, 5b, 5c are elevational views corresponding respectively to FIGS. 4a, 4b and 4c;

FIG. 6 is a schematic top view of another embodiment of the means for propelling and steering the machine;

FIG. 7 shows schematically an elevational view of a cleaning appliance at the bottom of a swimming pool which moves by water ejection;

FIGS. 7a, 7b, 7c illustrate three positions during a change of direction of the appliance of FIG. 7 equipped with a device according to the invention;

FIG. 8 shows schematically an elevational view of another appliance for cleaning the bottom of a swimming-pool with water ejection, and FIGS. 8a, 8b, 8c illustrate three positions at the time of changing the direction of movement of the appliance of FIG. 8 equipped with the device of the invention.

DETAILED DESCRIPTION OF THE PREFERRED EMBODIMENTS

FIG. 1 illustrates the principle of movement of a selfdriven machine 1 equipped with a device according to the invention.

The machine moves over a surface, which may be flat or not, to be treated, defined by rectangle 2.

The aim is to cause the machine 1, which carries out any work such as one of those listed above, to sweep the whole of area 2 while never passing twice over the same place.

For this, the machine is connected to a fixed point 3 which is outside area 2 or at the edge thereof, by a flexible connection, such as a cable 4 whose other end is fixed to the machine by means of a winder-unwinder shown symbolically at 5, mounted on machine 1.

The movement of machine 1 takes place along concentric arcs of circles (A, C, E, G, I, K, M and P) centred on point 3. The interval or pitch between two consecutive arcs of circles is constant and corresponds to a given length of cable released by the winder-unwinder 5 whenever the machine arrives at the end of each arc of a circle. This end, which corresponds to the limit of the area to be treated, is defined by an obstacle (not shown in FIG. 1) placed in line with the sides of rectangle 2 and against which machine 1 abuts.

This obstacle may for example be the vertical walls of a room whose surface is the rectangle 2. The obstacle may also be an added removable element, such as a slide. This obstacle may be formed in many ways, its role being essentially to stop progression of the machine in line with the limits of the area to be treated.

In accordance with the invention, when the machine meets such an obstacle, the winder-unwinder 5 is tripped so as to release a given length of cable and the propulsive system of the machine is adapted so that, in response to contact with the obstacle, it moves the machine so that it moves away from the fixed point 3 while skirting the obstacle, so as to stretch the cable again then, once the cable has been stretched, it drives the machine in a direction opposite the direction before meeting the obstacle. The manner in which these operations are performed is described in more detail below in connection with the specific embodiments illustrated in FIGS. 4a-8c. At B, D, F, H, J, L and N in FIG. 1 have been shown the rectilinear path sections of the machine 1 corresponding to the extension of the length of cable 4 and permitting the machine to pass from one arc of a circle to the next.

Thus, by a succession of movements over arcs of circles, the machine will sweep the whole of the rectangular area 2 without passing twice over the same place. At the outset, the machine is placed by hand on the surface to be treated, as close as possible to the fixed point 3 and is started along the first arc of a circle. At the end of the last arc of a circle P, the machine meets for the last time at Q the obstacle surrounding the area. The winder-unwinder will again release the cable. However, because of the proximity of the end of the area, the machine cannot move sufficiently to stretch the cable again. A device for detecting the tension of cable 4 provided on the machine detects, with an appropriate delay, the absence of tension in the cable and stops the machine. Rewinding of the cable on the winder-unwinder will take place either manually or by means of an auxiliary motor mounted on the machine. The fixed point 3 is preferably, but not necessarily, in the vicinity of one of the angles of the rectangle 2.

In FIG. 2, one embodiment has been shown in greater detail of the means permitting machine 1 to follow the path A to P.

The means comprise an abutment bar 6, substantially in the form of a half circle, articulated in the middle about a vertical shaft 7 fast with machine 1 and having at both its ends hooks 8 in the manner of an escape anchor of a clockwork mechanism.

At reference numeral 9 has been shown the winder-unwinder formed of a winding drum having a projection 10 capable of coming into abutment either against one of hooks 8, or against the other hook 8, the winder-unwinder being constantly driven in rotation by a spring system or some other suitable drive system, in a clockwise direction considering FIG. 2.

The winder-unwinder 9 is housed in the chassis of the machine and pivots about a vertical shaft 11. Cable 4 is partially wound on the drum of the winder-unwinder and leaves the chassis of the machine while being guided between two studs 12.

The machine 1 moves on the area to be treated 13 which is surrounded by vertical walls symbolized at 14 and forming the obstacles enabling the machine to change direction.

Different means for propelling the machine will be described further on.

When machine 1 is to leave the wall 14 on the left in FIG. 2, bar 6 rocks so that the left-hand hook 8 (pushed by said wall) forms an obstacle to projection 10 and prevents drum 9 from rotating in the direction of the arrow. The propulsive means for machine 1 drives this latter in the direction of arrow A (arc of a circle A).

When machine 1 meets the right-hand wall 12, bar 6 rocks, the left-hand hook 8 escapes from projection 10 and the drum 9 rotates by half a revolution until it is stopped by the other hook 8 which is placed by wall 14 in the path of projection 10. The winder-unwinder 9 thus freed delivers a given length of cable 4. The rotation by half a revolution of the winder-unwinder causes the movement of machine 1 to change direction in a direction B tending to move the machine away from the fixed point 3, the machine being forced to skirt wall 14.

At the end of this translational movement (B) of the machine (which is in position 1' in FIG. 2), cable 4 is again stretched which causes the machine 1' to change direction as shown by arrow C (arc of a circle C). Then, when the machine again meets the left-hand wall 14 (position 1''), bar 6 comes back to its initial position triggering a new half revolution of the winder-unwinder 9. The machine then moves parallel to the wall and then away from the wall in a manner discussed in more detail below by way of the specific examples illustrated in FIGS. 4a-8c.

FIGS. 4a, 4b, 4c and 5a, 5b, 5c illustrate one means for propelling the machine formed by a circular brush 15 whose shaft 16 is slanted with respect to the ground and which is in contact with this latter only along a small arc of a circle shown symbolically at 17 in the Figures.

The brush 15 is rotated in the direction of arrow 18 by a motor M carried by the machine whose chassis has been shown at 19 (FIGS. 4a and 5a) and at 20 three freely rotating wheels some of which may have a predetermined angular movement contributing to stretching cable 4, said arc 17 taking the place of the fourth wheel.

Shaft 16 for supporting and driving brush 15 is articulated about a fixed point 21 of the chassis, motor M being fixed to the end of shaft 16, outside the chassis. The slant of shaft 16 is modified by an operating member 22 (jack, electromagnet, etc. . . .) carried by the chassis 19 and itself controlled by the abutment bar 6 with which the machine is provided (not shown in FIGS. 4a to 5c).

In FIG. 4a, the machine moves, because of the friction of the brush 15 on the ground in line with the arc 17 in the direction shown by arrow 23, i.e. substantially in the axis of the two wheels 20 on each side of arc 17. FIGS. 5a to 5c show the brush 15 seen in elevation from the right respectively of FIGS. 4a to 4c.

A modification by member 22 of the slant of shaft 16 (initiated by bar 6 in contact with wall 14 for example) makes it possible (FIGS. 4b, 5b) to orient the machine in the direction shown by the arrow 24, in the direction moving the machine away from the fixed point 3. A new modification of the slant of shaft 16 (at the opposite of the position shown in FIG. 5a with respect to the median position shown in FIG. 5b) causes the machine to move in the direction of arrow 25 (FIG. 4c).

Considering the traction axis of the cable 4 (substantially merging with the direction illustrated by arrow 24), the movement of the machine along arrow 25 corresponds to a path in a direction which is the reverse of that corresponding to arrow 23. Such a device then makes it possible for the machine to travel over the paths illustrated by arrows A, B and C of FIG. 2.

FIG. 6 shows schematically the bottom of a machine having wheels 26 of the same type as wheels 20 and moved by friction by means of a truncated cone-shaped roller 27 with horizontal axis driven by a motor M, the axis of the assembly being substantially in the general axis of the cable. The difference of diameter d/D of roller 27 induces a movement which stretches cable 4 permanently and causes rotation of the winder-unwinder when the abutment bar releases the rotation. The change of direction of movement of the machine is obtained by reversing the direction of rotation of motor M, such reversal being controlled by said abutment bar.

The abutment bar and the winder-unwinder are for example identical to those shown in FIG. 2.

FIGS. 7 and 7a to 7c illustrate another propulsive means, by water ejection, of known type. Machine 1, intended for cleaning swimming-pools, comprises a chassis with wheels over which a water ejection nozzle 28 is mounted via connection 29 connected to a flexible pipe (not shown) feeding the propulsive water. With nozzle 28 is associated a deflector 30 mounted fixedly on the chassis whereas nozzle 28 is mounted for swivelling.

The machine of course comprises an abutment bar 6 controlling the changes of direction of the machine and a winder-unwinder similar to that shown at 9, 10 in FIG. 2.

In the position illustrated by FIG. 7a, the machine moves along arrow 31, i.e. substantially at the opposite of the water outlet (arrow 32) of the nozzle 28.

When the winder-unwinder 9 is released by the bar 6 (whose left-hand hook 8 escapes from the projection 10) the nozzle 28 (which is fixed to and thus rotates with with the winder-unwinder) pivots (FIG. 7b), causing a movement of the machine in a general direction (arrow 33) merging with that of cable 4, until the winder-unwinder 9, 10 is stopped in its rotation by the other hook 8 of bar 6.

At this time, the direction of movement of the machine is stabilized along arrow 34 which corresponds to a movement in a direction opposite that of FIG. 7a.

Finally, FIGS. 8 and 8a to 8c illustrate a variant of the water ejection propulsive device. In this variant, machine 1, charged with sucking up the debris resting at the bottom of the swimming-pool, is propelled, in a known way, by a nozzle 35 whose thrust axis (arrow 36) intersects the vertical axis of the machine (contrary to the device of FIG. 7a whose nozzle 28 has its thrust axis offset with respect to said axis). The nozzle is of course mounted for swivelling on the chassis of the machine but is not fast for rotation with the winder-unwinder. No deflector is provided and the change of direction of nozzle 35 is obtained by means of a member such as that shown at 22 in FIG. 5a, acting directly on the nozzle and controlled by the abutment bar of the machine. This bar, as well as the winder-unwinder are, for example, identical to those shown at 6, 9 and 10 in FIG. 2. FIGS. 8a to 8c illustrate the three possible positions of nozzle 35 generating the three directions of movement of the machine causing it to describe the paths illustrated at A, B and C in FIG. 2.

Generally, the propulsive means of the machine are adapted so as to move the machine so as to permanently stretch cable 4, i.e. by striving to move the machine constantly away from the fixed point 3.

The extension of cable 4 at each change of direction is given either by the diameter of the winder-unwinder (5, 9) or by the presence of several notches (fixed or mobile) carried by the winder-unwinder, or by modifying the position of hook 8 along the abutment bar 6.

The cable 4 may be a simple traction cable or an electric cable supplying the machine with energy or a fluid supply pipe, supplying for example the propulsive and cleaning water for the machine of FIG. 8.

The point 3 about which the machine-cable assembly pivots is either a fixed point, or an intermediate point (permanent or temporary) between the end of the cable opposite the machine and this latter, this intermediate point being placed as close as possible to the periphery of the surface to be treated.

This surface may be freed so that the machine may move freely without meeting any obstacle inside said area.

Finally, the invention is obviously not limited to the embodiments shown and described above but covers on the contrary all variants thereof particularly in so far as the nature of the means for changing the direction of movement of the machine are concerned and the means for detecting the obstacle disposed at the periphery of the area to be treated and for controlling said change of direction means.

I claim:

1. A device for controlling the movement of a machine on a surface, said device comprising:
   (A) an obstacle disposed along at least part of a periphery of an area to be traversed by said machine;
   (B) a winder-unwinder device connected to said machine;
   (C) an anchor which is located remote from said machine and which is stationary with respect to said surface;
   (D) a flexible connection attached at one end to said machine at another end to said anchor;
   (E) obstacle detector means, carried by said machine, for detecting the presence of said obstacle;
   (F) means for freeing a given length of said connection when said obstacle is detected by said obstacle detector means, and
   (G) propulsive means for causing said machine to travel in a direction in which said connection is stretched again after said given length of said connection is freed, and for then causing said machine to travel in a direction which is opposite to a direction in which said machine was travelling before said obstacle was detected.

2. The device of claim 1, wherein said winder-unwinder device comprises a rotatable drum having a projection formed thereon, and wherein said obstacle detector means comprises an abutment bar which is formed in the shape of a clockwork escapement anchor having opposed ends, and wherein each of said ends is provided with a hook which selectively contacts said projection of said drum to permit a given fraction of rotation of said drum, thereby permitting the unwinding of said given length of said connection.

3. The device according to claim 1 or 2, wherein said propulsive means comprises:
   a motor which is carried by said machine,
   a brush having a shaft which is slanted with respect to the horizontal, said brush contacting said surface by a fraction of an arc of a circle at its periphery and being driven by said motor, and
   a control member which is controlled by said obstacle detector means and which controls the direction of slant of said shaft with respect to the horizontal.

4. The device according to claim 1 or 2, wherein said connection comprises a cable having a longitudinal axis.

5. The device according to claim 4, wherein said propulsive means comprises:
   a motor which is mounted on said machine and which has an axis of rotation which is controlled by said obstacle detector means, and
   a truncated conical roller which is driven by said motor and which has an axis of said rotation which substantially merges with said longitudinal axis of said cable.

6. The device according to claim 1 or 2, wherein said surface comprises a bottom surface of a swimming pool, and wherein said propulsive means comprises a water ejection nozzle which is mounted for swivelling on said machine and the orientation of which is controlled by said obstacle detector means.

7. The detector according to claim 6, further comprising a deflector which is fixed to said machine, and wherein said water ejection nozzle rotates with said winder-unwinder device and has a water outlet which has a axis which is offset with respect to the vertical axis of said machine.

8. The device according to claim 6, wherein said water ejection nozzle has a water outlet which has an axis which intersects the vertical axis of said machine and which is oriented via said obstacle detector means.

9. A method of controlling the movement of a machine on a surface having an obstacle provide along at least part of a periphery of an area to be traversed by said machine, said machine having a winder-unwinder device which is mounted thereon and to which is connected an end of a flexible connection, which connection is at least partially wound onto said winder-unwinder device, said method comprising the steps of:

(A) attaching another end of said connection to an anchor which is located remote from said machine and which is stationary with respect to said surface;

(B) propelling said machine to travel in a first direction with said connection being stretched between said machine and said anchor; then (C) detecting the presence of said obstacle via an obstacle detector located on said machine, then (D) freeing a given length of said connection from said winder-unwinder device, then (E) propelling said machine to travel in a direction in which said connection is stretched again, and then (F) propelling said machine to travel in a direction which is opposite to said first direction.

* * * * *